US011843889B2

(12) United States Patent
Young

(10) Patent No.: US 11,843,889 B2
(45) Date of Patent: *Dec. 12, 2023

(54) IMAGE SENSORS WITH HYBRID ANALOG-TO-DIGITAL CONVERTER ARCHITECTURE

(71) Applicant: SEMICONDUCTOR COMPONENTS INDUSTRIES, LLC, Phoenix, AZ (US)

(72) Inventor: Brian Young, Albany, OR (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,336

(22) Filed: May 13, 2022

(65) Prior Publication Data

US 2022/0272294 A1 Aug. 25, 2022

Related U.S. Application Data

(63) Continuation of application No. 17/134,761, filed on Dec. 28, 2020, now Pat. No. 11,363,227.

(51) Int. Cl.
*H04N 25/75* (2023.01)
*H04N 25/772* (2023.01)

(52) U.S. Cl.
CPC ........... *H04N 25/75* (2023.01); *H04N 25/772* (2023.01)

(58) Field of Classification Search
CPC .... H04N 5/378; H04N 5/37455; H04N 25/75; H04N 25/772
See application file for complete search history.

(56) References Cited

U.S. PATENT DOCUMENTS

| 11,363,227 | B1 * | 6/2022 | Young | H04N 25/75 |
| 2011/0025900 | A1 * | 2/2011 | Kondo | H04N 25/75 |
| | | | | 348/308 |
| 2012/0287316 | A1 | 11/2012 | Kim et al. | |
| 2015/0008308 | A1 | 1/2015 | Huang et al. | |
| 2015/0303937 | A1 | 10/2015 | Gou et al. | |
| 2020/0014873 | A1 * | 1/2020 | Abe | H03M 1/56 |
| 2021/0250530 | A1 * | 8/2021 | Paik | H04N 25/772 |

OTHER PUBLICATIONS

Lim et al., "A High-Speed CMOS Image Sensor With Column-Parallel Two-Step Single-Slope ADCs," in IEEE Transactions on Electron Devices, vol. 56, No. 3, pp. 393-398, Mar. 2009.

* cited by examiner

*Primary Examiner* — Nicholas G Giles
(74) *Attorney, Agent, or Firm* — Treyz Law Group, P.C.; Tianyi He

(57) ABSTRACT

An image sensor may include an image sensor pixel array, row control circuitry, and column readout circuitry. The column readout circuitry may include analog-to-digital converter (ADC) circuitry. The ADC circuitry may have a first portion that selectively converts pixel signals associated with a low light or high conversion gain operating environment and a second portion that converts any pixel signals. As an example, the first portion may be a ramp ADC and the second portion may be a successive approximation register (SAR) ADC.

19 Claims, 5 Drawing Sheets

IMAGE SENSORS WITH HYBRID ANALOG-TO-DIGITAL CONVERTER ARCHITECTURE

This application is a continuation of U.S. patent application Ser. No. 17/134,761, filed on Dec. 28, 2020, which is hereby incorporated by reference herein in its entirety.

BACKGROUND

This relates generally to imaging systems and more specifically to image sensors having analog-to-digital converter (ADC) circuitry.

A typical image sensor includes active image sensor pixels that generate image signals in response to incident light. As part of readout circuitry for the image sensor pixels, ADC circuitry can convert the analog signals from the image sensor pixels to corresponding digital data.

It is often desirable for image sensors such as high dynamic range image sensors to include ADC circuitry designed to optimize for various operating parameters such as low noise, low power, and a high frame rate, which are often conflicting parameters that needs to be traded off. As an example, an image sensor employing a successive approximation register (SAR) ADC architecture can achieve low noise, but requires column gain to do so. However, doing so increases area usage and power usage. As another example, an image sensor employing a ramp ADC architecture can achieve a desired (high) bit resolution, but requires high-speed clocks to do so. However, this increases manufacturing (wafer) costs associated with the smaller geometry processes required to provide the high-speed clocks. It may therefore be desirable to provide an ADC architecture that simultaneously optimizes for multiple operating parameters.

It is within this context that the embodiments herein arise.

DETAILED DESCRIPTION

Electronic devices such as digital cameras, computers, cellular telephones, and other electronic devices may include image sensors that gather incoming light to capture an image (e.g., an image frame). The image sensors may include arrays of image sensor pixels. The pixels in the image sensors may include photosensitive elements such as photosensitive elements that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
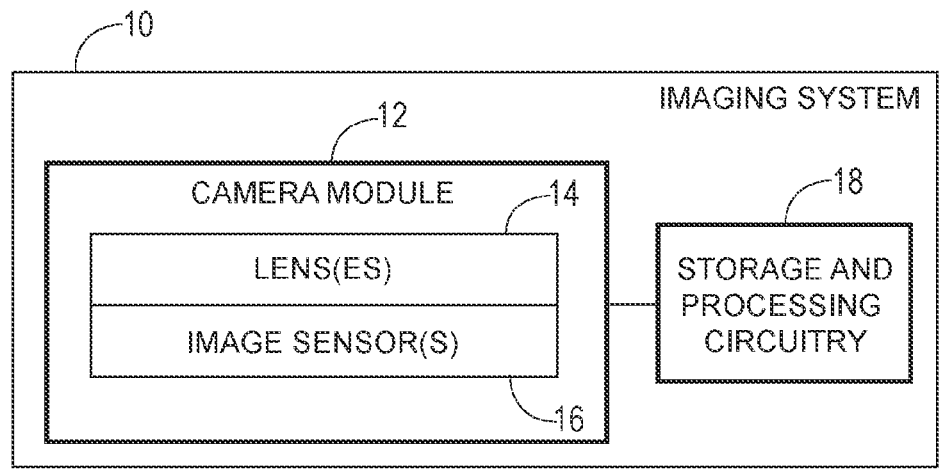
FIG. 1 is a diagram of an illustrative imaging system having an image sensor and processing circuitry in accordance with some embodiments.

FIG. 1 is a diagram of an illustrative imaging system such as an electronic device that uses an image sensor to capture images. Imaging system 10 of FIG. 1 may be a camera, a cellular telephone, a tablet computer, a webcam, a video camera, a video surveillance system, an automotive imaging system, a video gaming system with imaging capabilities, an augmented reality and/or virtual reality system, an unmanned aerial vehicle system (e.g., a drone), an industrial system, or any other desired imaging system or device that captures digital image data. Camera module 12 (sometimes referred to as an imaging module) may be used to convert incoming light into digital image data. Camera module 12 may include one or more lenses 14 and one or more corresponding image sensors 16. During image capture operations, light from a scene may be focused onto image sensor 16 by lenses 14. Image sensor 16 may include analog-to-digital converter (ADC) circuitry for converting analog pixel signals into corresponding digital image data that is provided to storage and processing circuitry 18.

Storage and processing circuitry 18 may include one or more integrated circuits (e.g., image processing circuits, microprocessors, storage devices such as random-access memory and non-volatile memory, etc.) and may be implemented using components that are separate from the camera module and/or that form part of the camera module. When storage and processing circuitry 18 is included on different integrated circuits than those of image sensors 16, the integrated circuits with circuitry 18 may be vertically stacked or packaged with respect to the integrated circuits with image sensors 16. Image data that has been captured by the camera module may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

Figure 2:
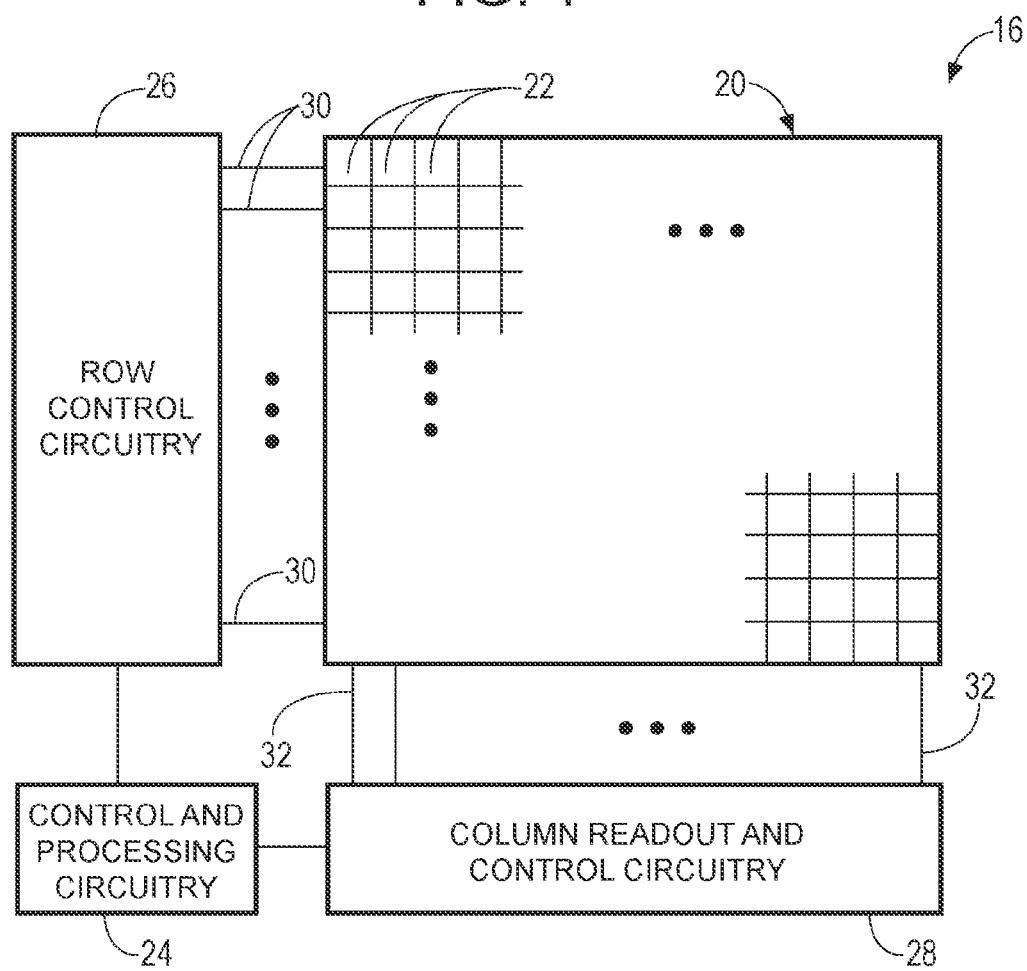
FIG. 2 is a diagram of an illustrative image sensor having a pixel array and corresponding control and readout circuitry in accordance with some embodiments.

As shown in FIG. 2, image sensor 16 may include pixel array 20 containing image sensor pixels 22 (sometimes referred to herein as image pixels or pixels) arranged in rows and columns, and may include control and processing circuitry 24. Array 20 may contain, for example, hundreds or thousands of rows and columns of image sensor pixels 22. Control circuitry 24 may be coupled to row control circuitry 26 (sometimes referred to as row driver circuitry) and column readout and control circuitry 28 (sometimes referred to herein as column readout circuitry or column control circuitry, or simply readout circuitry when not associated with columns of pixel 22). Row control circuitry 26 may receive row addresses from control circuitry 24 and supply corresponding row control signals such as reset, anti-blooming, row select, charge transfer, dual conversion gain mode, and readout control signals to pixels 22 over row control paths 30. One or more conductive lines such as column lines 32 may be coupled to each column of pixels 22 in array 20. Column lines 32 may be used for reading out (reset level or image level) signals from pixels 22 and for supplying bias signals (e.g., bias currents or bias voltages) to pixels 22. If desired, during pixel readout operations, a pixel row in array 20 may be selected using row control circuitry 26 and a signal generated by each corresponding image pixel 22 in that pixel row can be read out along a respective column line 32.

Column readout circuitry 28 may receive signals (e.g., analog pixel values generated by pixels 22) over column lines 32. Column readout circuitry 28 may include memory circuitry for temporarily storing calibration signals (e.g., reset level signals, reference level signals) and/or image signals (e.g., image level signals) read out from array 20, amplifier circuitry or a multiplier circuit, analog to digital converter (ADC) circuitry, bias circuitry, latch circuitry for selectively enabling or disabling the column circuitry, or other circuitry that is coupled to one or more columns of pixels in array 20 for operating pixels 22 and for reading out signals from pixels 22. After reading out and/or processing signals from pixel 22, readout circuitry 28 may supply the readout pixel data to control and processing circuitry 24 and/or processor 18 (FIG. 1) for further processing and/or storage.

Pixel array 20 may also be provided with a filter array having multiple (color) filter elements (each corresponding to a respective pixel) which allows a single image sensor to sample light of different colors or sets of wavelengths. As an example, image sensor pixels 22 may be provided with a color filter array having red, green, and blue filter elements, which allows a single image sensor to sample red, green, and blue (RGB) light using corresponding red, green, and blue image sensor pixels arranged in a Bayer mosaic pattern. In other suitable examples, the green pixels in a Bayer pattern may be replaced by broadband image pixels having broadband color filter elements (e.g., clear color filter elements, yellow color filter elements, etc.), or one of the green pixels in a Bayer pattern may be replaced by infrared (IR) image pixels formed under IR color filter elements and/or the remaining red, green, and blue image pixels may also be sensitive to IR light (e.g., may be formed under filter elements that pass IR light in addition to light of their respective colors). These examples are merely illustrative and, in general, filter elements of any desired color and/or wavelength and in any desired pattern may be formed over any desired number of image pixels 22.

Configurations in which pixels 22 are high dynamic range pixels each configured to generate multiple image signals optimized for corresponding light environments (e.g., low light, mid light, high light, etc.) and useable to form a portion of a high dynamic range image are described herein as illustrative examples. In scenarios where pixels 22 are high dynamic range pixels, pixels 22 may generate the multiple image signals based on different corresponding integration times (e.g., generate a first image signal based on a first integration time, generate a second image signal based on a second integration time, generate a third image based on a third integration time, etc.), may generate the multiple image signals selectively using a high conversion gain or a low conversion gain (e.g., generate a high light signal using a low conversion gain, generate a low light signal using a high conversion gain, etc.), and/or may generate any other suitable image signal in other suitable manners to provide high dynamic range functionalities. However, if desired, pixels 22 may be pixels of any suitable type (e.g., have any suitable pixel configuration).

In some illustrative configurations, each pixel 22 may include a photosensitive element (e.g., photodiode) that receives incident light over a period of time (e.g., an integration time period or an exposure time period) and may generate electric charge based on the incident light. Pixel 22 may include an anti-blooming transistor that couples the photodiode to a voltage terminal such as a supply voltage source to prevent blooming at the photodiode and/or to selectively reset the photodiode at a reset voltage level (e.g., the supply voltage level).

Pixel 22 may also include a floating diffusion region having an associated charge storage capacity (capacitance). One or more transfer transistors may couple the photodiode to the floating diffusion region. One or more of these transfer transistors may be activated to transfer photodiode-generated charge to the floating diffusion region for pixel readout operations (e.g., reading out image level signals corresponding to the charge at the floating diffusion region from pixel 22). A reset transistor may couple the floating diffusion region to a voltage terminal such as a supply voltage source to selectively reset floating diffusion region to a reset voltage level (e.g., the supply voltage level). The reset level charge at the floating diffusion region may also be read out as reset level signals. If desired, the reset transistor (in combination with other transistors) may be used to reset other portions of pixel 22 to the reset voltage level.

To enable the pixel readout operations, pixel 22 may include a source follower transistor and a row select transistor (sometimes collectively referred to herein as pixel readout circuitry). The source follower transistor may have a gate terminal coupled to the floating diffusion region, a first source-drain terminal (e.g., one of a source or drain terminal) coupled to a voltage terminal (e.g., supplying a supply voltage), and a second source-drain terminal (e.g., the other one of the source or drain terminal) coupled to the row select transistor. When the control signal for the row select transistor is asserted (e.g., during a pixel row readout operation when reset and/or image level signals from pixels in a given row that includes pixel 22 are being read out), a pixel output signal may be passed onto a pixel output path (e.g., column line 32 in FIG. 2). The pixel output signal may be an output signal having a magnitude that is proportional to the amount of charge at the floating diffusion region (e.g., may represent a reset level signal when the amount of charge at the floating diffusion region is associated with reset level charge or may represent an image level signal when the amount of charge at the floating diffusion region is associated with image level or photodiode-generated charge).

If desired, pixel 22 may include other elements that provide additional (e.g., high dynamic range) functionalities to pixel 22. As examples, pixel 22 may include one or more local charge storage region such as one or more storage gate or diodes coupled between the photodiode and the floating diffusion region (e.g., in series and/or in parallel along separate paths between the photodiode and the floating diffusion region), may include one or more low gain capacitors coupled the floating diffusion region via corresponding conversion gain select transistors, may include one or more additional photosensitive elements, and/or may include any other suitable elements. These examples of pixel configuration for pixel 22 are merely illustrative.

As described in connection with FIG. 2, a set of pixels 22 (e.g., a column of pixels) may be coupled to (column) readout circuitry 28 via a shared conductive path (e.g., one of column lines 32). Readout circuitry 28 may include ADC circuitry that converts analog pixel values received from array 20 (e.g., each column of pixels) into corresponding digital pixel values (sometimes referred to as digital pixel data). In some applications, the ADC circuitry may be required to meet certain operating requirements by optimizing for one or more operating parameters such as low noise, low power, and a high frame rate. However, is often difficult to simultaneously optimize for multiple operating parameters as optimizing for a particular parameter can conflict with optimizing for another parameter (e.g., providing low noise may increase power consumption, providing increase resolution for high dynamic range may increase cost, etc.). It may therefore be desirable to provide an ADC architecture that simultaneously optimizes for multiple parameters (e.g. ADC circuitry that is low power and low noise, but provides high frame rate).

Figure 3:
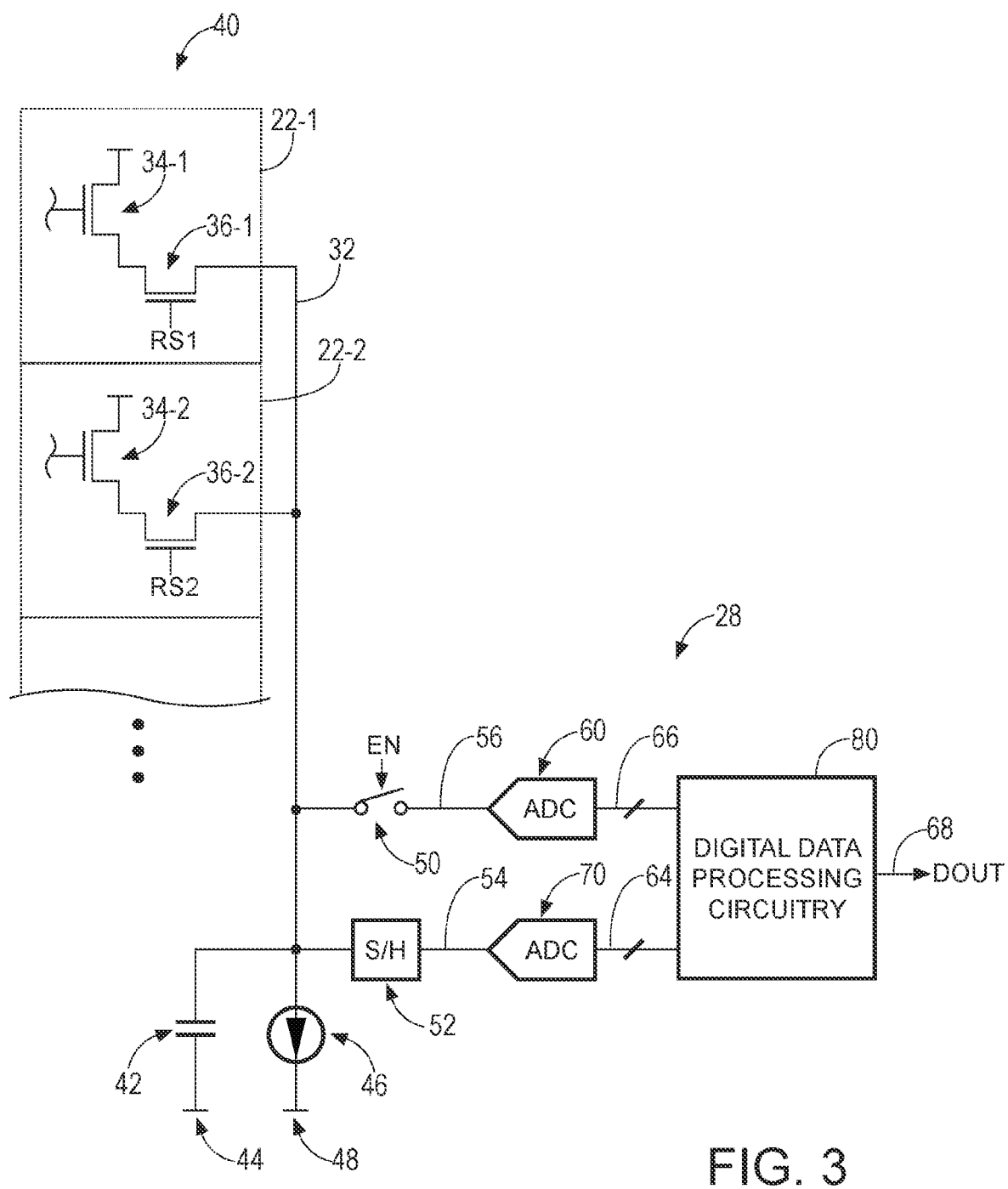
FIG. 3 is a diagram of an illustrative ADC architecture using two functionally different pieces of ADC circuitry in accordance with some embodiments.

FIG. 3 shows an illustrative low noise and low power ADC architecture for high frame rate operations using two functionally different ADC circuitry (e.g., a hybrid ADC architecture). In the example of FIG. 3, a particular set of pixels 22 (e.g., in pixel column 40) may be coupled an ADC circuitry portion of readout circuitry 28 via a shared conductive path such as a column line 32. While only one set (column) of pixels 22 is shown in FIG. 3, other sets (columns) of pixels 22 in array 20 (FIG. 2) may be coupled to ADC circuitry portions analogous to the one shown in FIG. 3. If desired, the ADC circuitry portion shown in FIG. 3 may be shared between different sets (columns) of pixels 22.

Two illustrative pixels 22-1 and 22-2 are shown to be in column 40 in FIG. 3. However, column 40 may include any suitable number of additional pixels, collectively with pixels 22-1 and 22-2 defining the number of rows in array 20 (FIG. 2). Additional columns may be adjacent to column 40 in array 20, collectively defining the number of columns in array 20. While each pixel may include numerous elements (as described above), only source follower transistor 34 and row select transistor 36 are explicitly shown in FIG. 3 in order to not unnecessarily obscure the embodiments of FIG. 3.

In particular, source follower transistor 34-1 in pixel 22-1 may have a gate terminal coupled to the floating diffusion region of pixel 22-1 and may be selectively connected to column line 32 when control signal RS1 is asserted to activate row select transistor 36-1 in pixel 22-1. In a similar manner, other pixels 22 in column 40 may be coupled to column line 32 (e.g., source follower transistor 34-2 in pixel 22-2 may have a gate terminal coupled to the floating diffusion region of pixel 22-2 and may be selectively connected to column line 32 when control signal RS2 is asserted to activate row select transistor 36-2 in pixel 22-2).

Current source 46 coupled to voltage terminal 48 (e.g., supplying a ground voltage) may also be coupled to and may supply a bias current onto column line 32 to help drive signals off of pixels 22, onto column line 32, and into readout circuitry 28. Capacitor 42 shown to be coupled to column line 32 and voltage terminal 44 in FIG. 3 may be representative of any stray capacitance associated with column line 32. In particular, the existence of the capacitance of capacitor 42 may cause RC time delay effects on signals introduced onto column line 32 (e.g., signals read out from pixels 22), thereby introducing a settling time (or a slew time associated with a slew rate) for these signals to settle to their true (settled) voltages.

Readout circuitry 28 may include first ADC circuitry 60 selectively coupled to column line 32 via switch 50 (controlled by control signal EN) along path 56. Readout circuitry 28 may include second ADC circuitry 70 coupled to column line 32 via sample-and-hold (S/H) circuitry 52 along path 54. If desired, sample-and-hold circuitry 52 may be omitted or may be incorporated into ADC circuitry 70 (e.g., be formed as part of ADC circuitry 70).

ADC circuitry 60 may be coupled to digital data processing circuitry 80 via path 66 (e.g., providing any suitable number of bits from the conversion process of ADC circuitry 60 via parallel paths to processing circuitry 80). ADC circuitry 60 may be coupled to digital data processing circuitry 80 via path 64 (e.g., providing any suitable number of bits from the conversion process of ADC circuitry 70 via parallel paths to processing circuitry 80). Digital data processing circuitry 80 may process the received bits from ADC circuitry 60 and the received bits from ADC circuitry 70 to generate the final digital data DOUT on path 68 (associated with the corresponding reset or image level signals, or other signals received at ADC circuitry 60 and 70). In scenarios, where only one of ADC circuitry 60 or 70 is used (e.g., when ADC circuitry 60 is disabled or in an off state, and ADC circuitry 70 is enabled in an on state), digital data processing circuitry 80 may generated final digital data DOUT based on the one output from the one of ADC circuitry 60 or 70.

In the configuration of FIG. 3, first ADC circuitry 60 may be enabled to perform conversion operations (e.g., by closing and thereby activating switch 50) to selectively process low light signals such as when signals generated from pixel 22 operating in a high conversion gain mode are being read out (e.g., during the pixel output setting of these signals). ADC circuitry 60 may be optimized for converting low light signals (e.g., may have high resolution to better resolve the least significant bits of the digital output data). In particular, ADC circuitry 60 may desirably begin performing a corresponding conversion operation (e.g., begin slewing a ramp signal) during the settling time of the corresponding image signal (e.g., a low light signal) before the image signal has settled to its true (settled) voltage. By doing so, ADC circuitry 60 may operate with a faster readout time (e.g., as time normally spent waiting for a signal to settle is now being used to begin or perform a conversion operation), while providing high resolution conversion results for low light signals (e.g., using a ramp signal optimized for resolving low light signals, which have relatively short settling time periods).

In contrast, second ADC circuitry 70 may perform conversion operations to process each type of signal being read out (e.g., including the low light signal being converted by ADC circuitry 60, a high light signal generated during a low conversion gain mode of pixel operation, a mid-light signal, a short integration time period signal, a long integration time period signal, etc.). ADC circuitry 70 may be optimized for converting signals having a wide range of voltages (e.g., be configured to resolve the more (most) significant bits of the digital output data). The combination of ADC circuitry 60 and 70 may provide satisfactory conversion for different signals across a wide dynamic range (e.g., with high resolution low light data from ADC circuitry 60, with high light data from ADC circuitry 70, etc.).

Processing circuitry 80 may be configured to stitch together the digital output results from ADC circuitry 60 and ADC circuitry 70 to generate the final digital output DOUT. If desired, processing circuitry 80 may also include a global gain normalization system to compensate for any differences in the gain characteristics (e.g., transfer functions) between ADC circuitry 60 and ADC circuitry 70, and/or may generally include one or more systems for performing gain correction, offset correction, non-linearity correction, etc. on the received digital data to compensate for the operational characteristics of one or both of ADC circuitry 60 and ADC circuitry 70.

Figure 4:
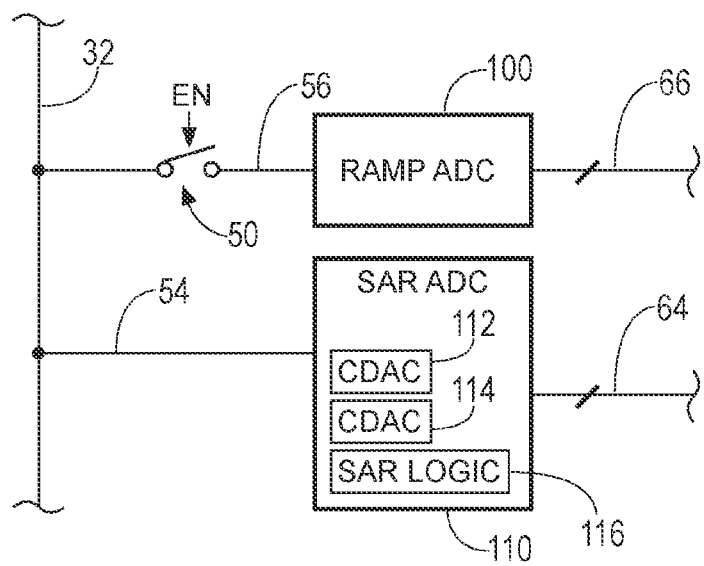
FIG. 4 is a diagram of an illustrative ADC architecture using ramp ADC circuitry and SAR ADC circuitry in accordance with some embodiments.

Configurations in which ADC circuitry 60 is implemented as a ramp ADC and ADC circuitry 70 is implemented as a SAR ADC are described herein as illustrative examples. FIG. 4 shows such an illustrative configuration including ramp ADC 100 and SAR ADC 110. In the example of FIG. 4, SAR ADC 110 may internally include sample-and-hold circuitry, and therefore sample-and-hold circuitry 52 (as shown in FIG. 3) is omitted from FIG. 4.

Ramp ADC 100 may include a comparator that receives a ramp signal and the input analog signal to be converted. Based on this comparison (e.g., once the voltage of the ramp signal meets or crosses the voltage of the input analog signal), a corresponding digital output is provided (e.g., output on path 66). SAR ADC 110 may also include a comparator coupled to a capacitive digital to analog converter (CDAC) that selectively provides the comparator with reference voltages to be compared to the input analog signal. SAR ADC 100 may include SAR logic circuitry 116 that is configured to control the CDAC to resolve the corresponding output digital data in a bit-wise manner (e.g., starting with the most significant bit, resolving each bit until the least significant bit capable by SAR ADC 100 is resolved). SAR logic circuitry 116 may provide the fully resolve digital output data on path 64.

Configurations in which SAR ADC circuitry 110 includes two CDACs 112 and 114, and two corresponding comparators that are operable in parallel to process different input analog signals and that share common SAR logic circuitry 116 (e.g., are both controlled by SAR logic circuitry 116) are described herein as illustrative examples. If desired, SAR ADC circuitry 110 may include only one, more than two, or generally any number of CDACs and corresponding comparators. Each signal on path 54 may be selectively sampled and held at one analog signal input terminal of one of the corresponding comparators. SAR logic circuitry 116 may similarly output the corresponding digital output data along separate parallel paths 64 to processing circuitry 80 (FIG. 3).

The configuration of the ADC architecture using a ramp ADC and a SAR ADC in FIG. 4 is merely illustrative. As an example, if desired, any other type of ADC may be used instead of the SAR ADC in FIG. 4 (e.g., a delta-sigma ADC, a pipeline ADC, another ramp ADC, or other ADCs coupled with the sample-and-hold circuitry shown in FIG. 3).

Figure 5:
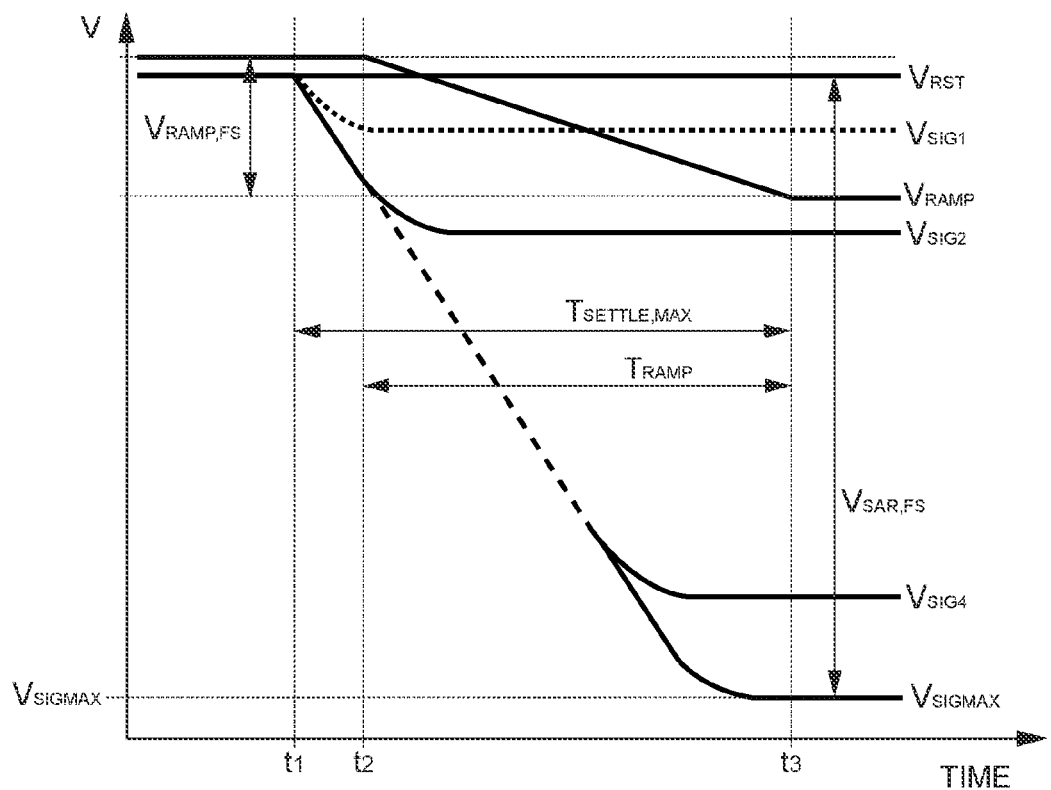
FIG. 5 is a graph showing various illustrative signals associated with the illustrative ADC architecture in FIG. 4 in accordance with some embodiments.

FIG. 5 is an illustrative timing diagram showing various signal characteristics handled by hybrid ADC circuitry (e.g., implemented using ramp ADC 100 and SAR ADC 110 in the configuration of FIG. 4). As shown in FIG. 5, the signals read out from pixels 22 vary in (settled) voltages and can include a reset level signal $V_{RST}$, and image level signals $V_{SIG1}$, $V_{SIG2}$, $V_{SIG4}$, and $V_{SIGMAX}$ as examples. Relatively low light image signals such as signal $V_{SIG1}$ (and the reset level signal), when being read out from pixel 22, settle relatively quickly to their actual (settled) voltage (e.g., on column line 32), while relatively high light image signals such as signal $V_{SIG4}$ and $V_{SIGMAX}$, when being read out from pixel 22, settle relatively slowly to their actual (settled) voltage (e.g., on column 32).

In other words, when a row select transistor in a corresponding pixel 22 is asserted at time t1 to connect the pixel 22 to column line 32, depending on the type of signal being read out from the pixel 22, ADC circuitry coupled to column 32 may need to wait different amounts of times to wait for signal settling (e.g., up to time period $T_{SETTLE,MAX}$ which is needed for the maximum light signal $V_{SIGMAX}$ to settle). To more efficiently perform conversion operations for relatively low light signals and reset level signals, ramp ADC 100 in FIG. 4 may start ramp signal $V_{RAMP}$ soon after time t1 (at time t2). This will also allow the ramp time period ($T_{RAMP}$) to end at time t3 and align with the conversion operation of SAR ADC 110 in FIG. 4. If desired, ramp signal $V_{RAMP}$ may begin even before time t2 (e.g., shortly after the corresponding charge transfer operation onto the floating diffusion region for readout).

By starting signal $V_{RAMP}$ at time t2 (e.g., instead of at time t3), ramp ADC 100 can make use of the shorter settling time of some of the signals, while providing higher resolution conversions (e.g., resolving the least significant bits) for these signals. As noted above in connection with FIG. 3, ADC circuitry 60 (e.g., ramp ADC 100) may be selectively enabled only to convert these relatively low light signals (and reset level signals). The ramp signal slew rate may be less than the pixel signal slew rate, and therefore, these small signals will settle before the ramp signal voltage crosses the pixel signal voltage, thereby providing proper conversion. In particular, signal $V_{RAMP}$ may have a relatively small full-scale voltage range $V_{RAMP,\,FS}$ (e.g., at the end of the ramp at time t3) to reach the shot noise limit.

To complement ramp ADC 100, SAR ADC 100 may perform sampling at time t3 for all signals (e.g., regardless of which signal is being read out from the pixel 22). The full-scale voltage range $V_{SAR,\,FS}$ of SAR ADC 100 may extend across all possible voltage for pixel signals (e.g., from the reset level voltage to the maximum image level voltage).

Figure 6:
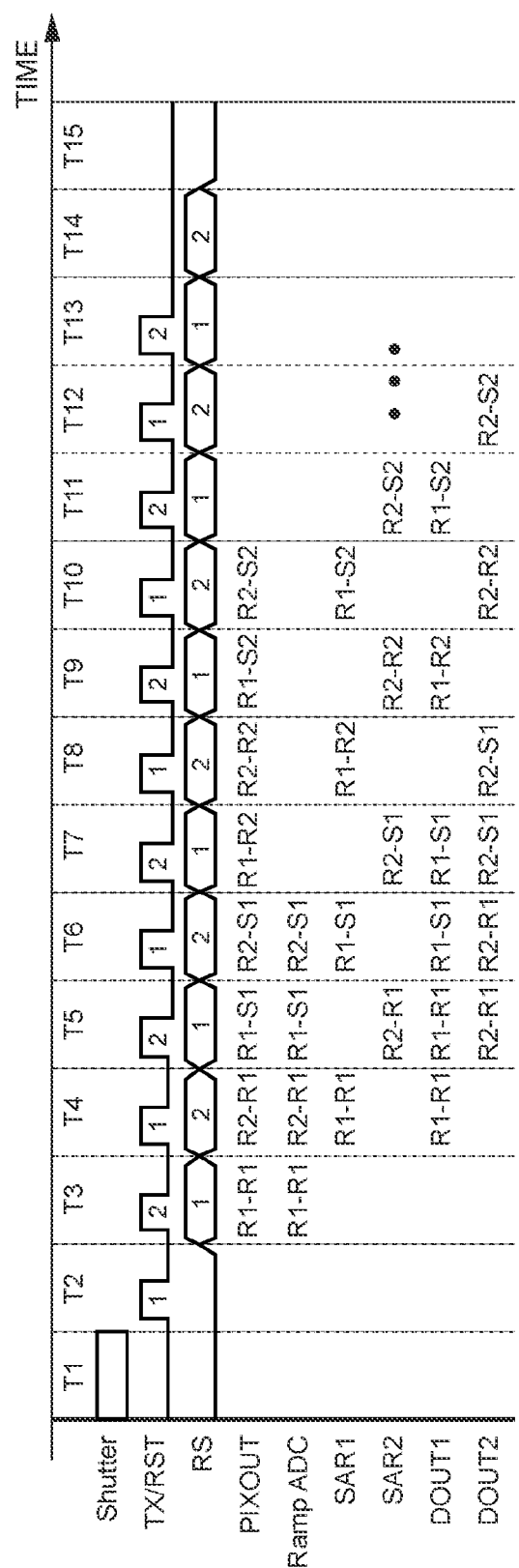
FIG. 6 is an illustrative timing diagram showing how illustrative ADC circuitry receives signals from pixels of two different rows and performs the corresponding conversion operations in accordance with some embodiments.

FIG. 6 shows an illustrative timing diagram for operating hybrid ADC circuitry (e.g., implemented using ramp ADC 100 and SAR ADC 110 in the configuration of FIG. 4) to perform readout operations for two pixels rows (e.g., pixel 22-1 in a first row and pixel 22-2 in a second row in FIG. 3).

As shown in FIG. 6, at during (time) period T1, one or more shuttering operations may occur across the pixel array (e.g., at pixels 22-1 and 22-2).

During period T2, the floating diffusion region of pixel 22-1 may be reset to a reset level voltage, which is subsequently read out by asserting row select signal RS for row 1 (signal RS1 in FIG. 3) during period T3. The pixel output PIXOUT (e.g., at shared column line 32 in FIG. 3) may therefore hold a "row 1—first reset level" signal (R1-R1). As described in connection with FIG. 5, ramp ADC 100 may begin operation (e.g., start the corresponding ramp signal) shortly after the assertion of the row select signal RS. As such, the ramp ADC operation for signal R1-R1 may also take place during period T3. The digital output resulting from the ramp ADC operation for signal R1-R1 may be output for row 1 as signal DOUT1 during period T4.

Additionally, as described in connection with FIG. 5, SAR ADC 100 may begin operation (e.g., start sampling signal R1-R1) at the end of the maximum signal settling time period at the end of period T3 or the beginning of period T4. As such, the SAR ADC operation for signal R1-R1 may take place during period T4 (e.g., using one CDAC and comparator set in SAR ADC 110 controlled by signal SAR1). The digital output for signal R1-R1 resulting from the SAR ADC operation (using signal SAR1) may be output for row 1 as signal DOUT1 during period T5.

During period T3, the floating diffusion region of pixel 22-2 may be reset to a reset level voltage, which is subsequently read out by asserting row select signal RS for row 2 (signal RS2 in FIG. 3) during period T4. The pixel output PIXOUT (e.g., at shared column line 32 in FIG. 3) may therefore hold a "row 2— first reset level" signal (R2-R1). As described in connection with FIG. 5, ramp ADC 100 may begin operation (e.g., start the corresponding ramp signal) shortly after the assertion of the row select signal RS. As such, the ramp ADC operation for signal R2-R1 may also take place during period T4. The digital output resulting from the ramp ADC operation for signal R2-R1 may be output for row 2 as signal DOUT2 during period T5.

Additionally, as described in connection with FIG. 5, SAR ADC 100 may begin operation (e.g., start sampling signal R2-R1) at the end of the maximum signal settling time period at the end of period T4 or the beginning of period T5. As such, the SAR ADC operation for signal R2-R1 may take place during period T5 (e.g., using the other CDAC and comparator set in SAR ADC 110 controlled by signal SAR2). The digital output for signal R2-R1 resulting from the SAR ADC operation (using signal SAR2) may be output for row 2 as signal DOUT2 during period T6.

During period T4, photodiode-generated charge may be passed to the floating diffusion region of pixel 22-1 (e.g., using one or more charge transfer transistors). The image level charge stored at the floating diffusion region may be subsequently read out by asserting row select signal RS for row 1 (signal RS1 in FIG. 3) during period T5. The pixel output PIXOUT (e.g., at shared column line 32 in FIG. 3) may therefore hold a "row 1—first image level" signal (R1-S1). As described in connection with FIG. 5, ramp ADC 100 may begin operation (e.g., start the corresponding ramp signal) shortly after the assertion of the row select signal RS. As such, the ramp ADC operation for signal R1-S1 may also take place during period T5. The digital output resulting from the ramp ADC operation for signal R1-S1 may be output for row 1 as signal DOUT1 during period T6.

Additionally, as described in connection with FIG. 5, SAR ADC 100 may begin operation (e.g., start sampling signal R1-S1) at the end of the maximum signal settling time period at the end of period T5 or the beginning of period T6. As such, the SAR ADC operation for signal R1-S1 may take place during period T6 (e.g., using the CDAC and comparator set in SAR ADC 110 controlled by signal SAR1). The digital output for signal R1-S1 resulting from the SAR ADC operation (using signal SAR1) may be output for row 1 as signal DOUT1 during period T7.

During period T5, photodiode-generated charge may be passed to the floating diffusion region of pixel 22-2 (e.g., using one or more charge transfer transistors). The image level charge stored at the floating diffusion region may be subsequently read out by asserting row select signal RS for row 2 (signal RS2 in FIG. 3) during period T6. The pixel output PIXOUT (e.g., at shared column line 32 in FIG. 3) may therefore hold a "row 2—first image level" signal (R2-S1). As described in connection with FIG. 5, ramp ADC 100 may begin operation (e.g., start the corresponding ramp signal) shortly after the assertion of the row select signal RS. As such, the ramp ADC operation for signal R2-S1 may also take place during period T6. The digital output resulting from the ramp ADC operation for signal R2-S1 may be output for row 2 as signal DOUT2 during period T7.

Additionally, as described in connection with FIG. 5, SAR ADC 100 may begin operation (e.g., start sampling signal R2-S1) at the end of the maximum signal settling time period at the end of period T6 or the beginning of period T7. As such, the SAR ADC operation for signal R2-S1 may take place during period T7 (e.g., using the CDAC and comparator set in SAR ADC 110 controlled by signal SAR2). The digital output for signal R2-S1 resulting from the SAR ADC operation (using signal SAR2) may be output for row 2 as signal DOUT2 during period T8.

In the example of FIG. 6, signals R1-R1, R2-R1, R1-S1, and R2-S1 (e.g., on pixel output PIXOUT at column line 32 during periods T3 to T6) may all be associated with low light or high conversion gain signals (e.g., image level signals generated based on low light conditions or a high conversion gain mode, reset level signals corresponding to these image level signals). In these scenarios, ramp ADC 100 may be activated (e.g., by enabling or activating switch 50 in FIG. 3). As shown in FIG. 6, ramp ADC 100 may continually use the same ramp signal during periods T3 to T6 to perform conversion operations.

However, for other signals such as mid light, high light, or low conversion gain image level signals or their corresponding reset level signals, ramp ADC 100 may be deactivated (e.g., by disabling or deactivating switch 50 in FIG. 3, switching ramp ADC 100 into an off state). In the example of FIG. 6, a second set of reset and image level signals for rows 1 and 2 (e.g., on pixel output PIXOUT at column line 32 during periods T7 to T9) shows such signals for which ramp ADC 100 is disabled. For these signals, the corresponding conversion operations using ramp ADC 100 are removed.

Configurations in which signals R1-R1, R2-R1, R1-S1, and R2-S1 are high conversion gain signals and signals R1-R2, R2-R2, R1-S2, and R2-S2 are low conversion gain signals are described herein as illustrative examples. If desired, additional sets of reset and image level signals for rows 1 and 2 (e.g., mid light signals, signals for varying integration times, mid conversion gain signals, etc.), which do not use ramp ADC 100 for conversion, may be held at pixel output PIXOUT during time periods T11 to T14.

Figure 7:
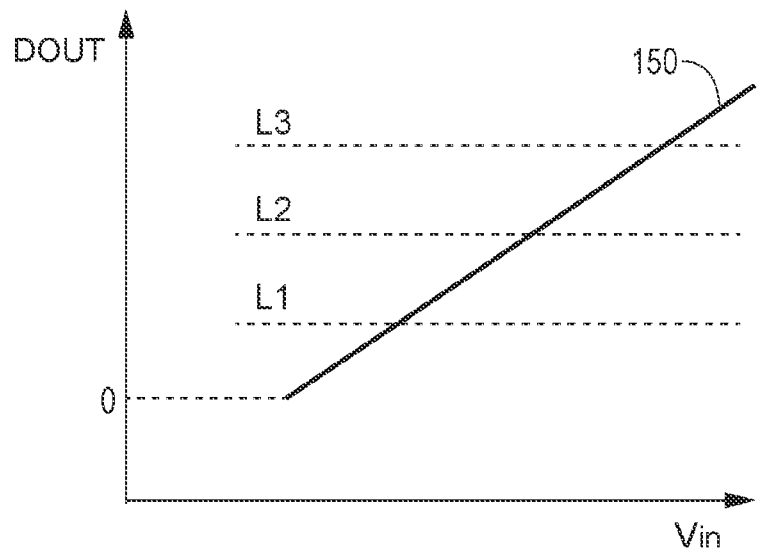
FIG. 7 is a graph showing illustrative transfer function characteristics for a portion of illustrative ADC circuitry in accordance with some embodiments.

FIG. 7 is a graph showing illustrative transfer function characteristics for a portion of the hybrid ADC circuitry (e.g., the transfer function characteristics of ADC circuitry 60 in FIG. 3 or ramp ADC 100 in FIG. 4). As shown in FIG. 7, ramp ADC 100 may convert an input analog signal Vin to a corresponding digital output Dout using a transfer function characterized by line 150 (representing the full-scale voltage range of ramp ADC 100). In particular, line 150 may cross three threshold noise level L1, L2, and L3. In particular, noise level L1 may be associated with ramp ADC input referred noise, noise level L2 may be associated with SAR ADC input referred noise, and noise level L3 may be associated with a shot noise floor. As such, it can be seen that ramp ADC 100 may introduce less input referred noise than SAR ADC 110 and may be better suited for conversion operations below the shot noise floor. The transfer function characteristics of ramp ADC 100 may be selectively configured relative to these three different noise levels (e.g., improvements over SAR ADC 110 resolution, configured to operate under the shot noise floor, etc.).

Figure 8:
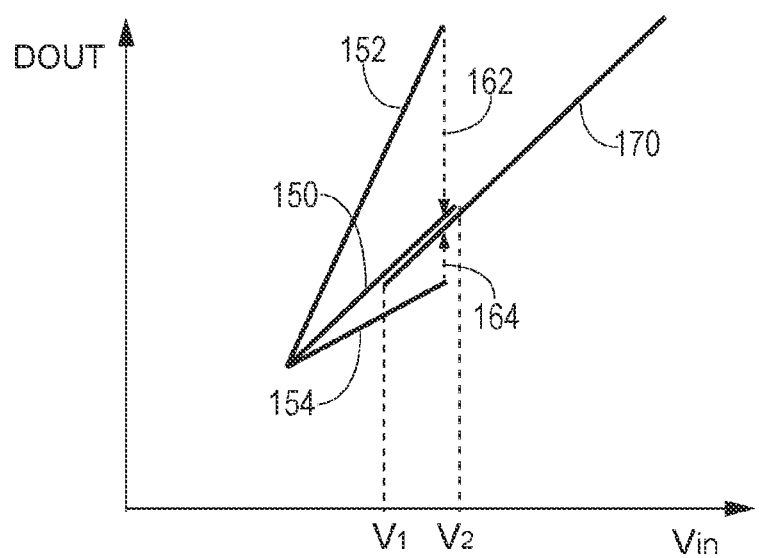
FIG. 8 is a graph showing illustrative transfer function characteristics for different portions of illustrative ADC circuitry in accordance with some embodiments.

FIG. 8 is a graph showing illustrative relative transfer function characteristics between different portions of the hybrid ADC circuitry (e.g., between ADC circuitry 60 and ADC circuitry 70 in FIG. 3, between ramp ADC 100 and SAR ADC 110 in FIG. 4, etc.). As shown in FIG. 8, a ramp ADC such as ramp ADC 100 may be configured with different gains such as a first gain characterized by the slope of line 150 associated with the corresponding ramp ADC transfer function, a second gain characterized by the slope of line 152 associated with the corresponding ramp ADC transfer function, and a third gain characterized by the slope of line 154 associated with the corresponding ramp ADC transfer function. A SAR ADC such as SAR ADC 110 may also have an associated gain such as the gain characterized by the slope of line 170 associated by the corresponding SAR ADC transfer function.

The respective transfer functions of the ramp ADC and the SAR ADC may have an overlap region (e.g., between input voltages $v_1$ and $v_2$). If there is a matching gain between the transfer functions of the ramp ADC and the SAR ADC, the two ADCs may serve as a proper extension of each other (e.g., lines 150 and 170 representing the two corresponding transfer functions may aligned to serve as a single continuous transfer function for the ADC system).

However, in scenarios where the gains from the two ADCs are not aligned, digital data processing circuitry 80 in FIG. 3 may be configured perform gain normalization or gain alignment operations based on the corresponding outputs of the two individual ADCs. In a first example where a first ADC has a gain corresponding to the transfer function of line 152 and a second ADC has a gain corresponding to the transfer function of line 170, processing circuitry 80 may counteract (or compensate for) the gain difference (e.g., by decreasing the corresponding gain indicated by arrow 162). In a second example where a first ADC has a gain corresponding to the transfer function of line 154 and a second ADC has a gain corresponding to the transfer function of line 170, processing circuitry 80 may counteract (or compensate for) the gain difference (e.g., by increasing the corresponding gain indicated by arrow 164).

These examples are merely illustrative. If desired, processing circuitry 80 may generally perform gain correction, offset correction, non-linearity correction, etc. to provide desirable output characteristics for the overall ADC system. If desired, line 170 may be shifted instead of or in addition to line 152 or 154 being shifted. If desired, control or processing circuitry may control the two ADCs to have aligned gains.

Various embodiments have been described illustrating systems and methods using an improved hybrid ADC architecture.

As an example, an image sensor may include a plurality (column) of pixels in an image sensor pixel array, a conductive (column) line coupled to each of the plurality of pixels, and analog-to-digital converter (ADC) circuitry coupled to the plurality of pixels via the conductive line. The ADC circuitry may include a first ADC such as a ramp ADC coupled to the conductive line via a switch and may include a second ADC such as a successive approximation register (SAR) ADC coupled to the conductive line using sample-and-hold circuitry (e.g., within the SAR ADC). The ADC circuitry may also include digital data processing circuitry coupled to a first output terminal of the first ADC and coupled to a second output terminal of the second ADC. The digital data processing circuitry may be configured to receive first digital output data for a given image signal from the first ADC and second digital output data for the given image signal from the second ADC, and to generate final digital output data for the given image signal based on the first and second digital output data. The digital data processing circuitry may include an analog-to-digital converter gain adjustment system that compensates for gain differences between the first and second ADCs.

If desired, the switch may be configured to be in an enabled state to connect the first ADC to the conductive line when a pixel output signal associated with a high conversion gain is passed onto the conductive line. If desired, the switch may be configured to be in a disabled state to disconnect the first ADC to the conductive line when an additional pixel output signal associated with a low conversion gain is passed onto the conductive line. If desired, the second analog-to-digital converter is configured to receive the pixel output signal and the additional pixel output signal.

As another example, an image sensor may include an image sensor pixel array having first and second pixels in first and second corresponding rows of the image sensor pixel array and in a same column of the image sensor pixel array. A column line may be coupled to the first and second pixels. A first ADC such as a ramp ADC may be selectively coupled to (and selectively decoupled from) the column line, and a second ADC such as a SAR ADC may be (continually) coupled to the column line. If desired, the SAR ADC may include a first capacitive digital-to-analog converter (CDAC) operable to perform a first conversion operation for the first pixel and a second CDAC operable to perform a second conversion operation for the second pixel. If desired, the SAR ADC includes SAR logic circuitry operable to control the first and second CDACs.

As yet another example, a method of performing analog-to-digital conversion to generate image data may include: providing a pixel signal from an image sensor pixel to a pixel output path, performing a first analog-to-digital conversion operation on the pixel signal using a ramp ADC based on a ramp signal, and performing a second analog-to-digital conversion operation on the pixel signal using an additional ADC after beginning the first analog-to-digital conversion operation. The method may further include: providing an additional pixel signal from the image sensor pixel to the pixel output path, and performing a third analog-to-digital conversion operation on the additional pixel signal using the additional ADC without using the ramp ADC to perform any analog-to-digital conversion operations on the additional pixel signal. As an example, the pixel signal may be a high conversion gain signal, and the additional pixel signal may be a low conversion gain signal.

If desired, the method may further include: providing an additional pixel signal from an additional image sensor pixel to the pixel output path, and performing a third analog-to-digital conversion operation on the additional pixel signal from the additional image sensor pixel using the ramp ADC while performing the second analog-to-digital conversion operation on the pixel signal using the additional ADC.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
    a plurality of pixels in an image sensor pixel array;
    a conductive line coupled to each of the plurality of pixels; and
    analog-to-digital converter circuitry coupled to the plurality of pixels via the conductive line, the analog-to-digital converter circuitry having:
        a first analog-to-digital converter coupled to the conductive line,
        a second analog-to-digital converter coupled to the conductive line, wherein the second analog-to-digital converter is a successive approximation register analog-to-digital converter, and
        a switch having a first terminal coupled to the first analog-to-digital converter and having a second terminal coupled to the second analog-to-digital converter wherein the first and second analog-to-digital converters are analog-to-digital converters of different types.

2. The image sensor defined in claim 1, wherein the switch is configured to selectively connect the first analog-to-digital converter to the conductive line without disconnecting the second analog-to-digital converter from the conductive line.

3. The image sensor defined in claim 1, wherein the first analog-to-digital converter is a ramp analog-to-digital converter configured to receive a ramp signal with a full-scale voltage range that is less than a full-scale voltage range of the successive approximation register analog-to-digital converter.

4. The image sensor defined in claim 1, wherein the successive approximation register analog-to-digital converter includes a first capacitive digital-to-analog converter and a second capacitive digital-to-analog converter.

5. The image sensor defined in claim 1 further comprising:
digital data processing circuitry coupled to an output path of the first analog-to-digital converter and coupled to an output path of the second analog-to-digital converter.

6. The image sensor defined in claim 5, wherein the digital data processing circuitry has an output path configured to provide a digital output corresponding to an analog input on the conductive line.

7. The image sensor defined in claim 5, wherein the digital data processing circuitry includes an analog-to-digital converter gain adjustment system.

8. The image sensor defined in claim 1, wherein the plurality of pixels are arranged in a column in the image sensor pixel array, and the conductive line is a column line.

9. The image sensor defined in claim 8, wherein the analog-to-digital converter circuitry is implemented within column readout circuitry.

10. The image sensor defined in claim 1, wherein the second analog-to-digital converter remains connected to the conductive line while the first analog-to-digital converter is selectively connected and disconnected to the conductive line.

11. The image sensor defined in claim 1, wherein the second analog-to-digital converter is configured to process a set of pixel signals from the plurality of pixels and wherein the first analog-to-digital converter is configured to process only a subset of pixel signals in the set of pixel signals.

12. An image sensor comprising:
a plurality of pixels in an image sensor pixel array;
a conductive line coupled to each of the plurality of pixels; and
analog-to-digital converter circuitry coupled to the plurality of pixels via the conductive line, the analog-to-digital converter circuitry having:
a first analog-to-digital converter coupled to the conductive line; and
a second analog-to-digital converter coupled to the column line, the second analog-to-digital converter having a first capacitive digital-to-analog converter and a second capacitive digital-to-analog converter.

13. The image sensor defined in claim 12, wherein the analog-to-digital converter circuitry includes a switch having a first terminal coupled to the first analog-to-digital converter and a second terminal coupled to the second analog-to-digital converter.

14. The image sensor defined in claim 12, wherein the second analog-to-digital converter is a successive approximation register analog-to-digital converter.

15. The image sensor defined in claim 14, wherein the successive approximation register analog-to-digital converter includes register logic circuitry operable to control the first and second capacitive digital-to-analog converters.

16. The image sensor defined in claim 14, wherein the first analog-to-digital converter is a ramp analog-to-digital converter.

17. An image sensor comprising:
an image sensor pixel;
a conductive line coupled to the image sensor pixel;
a first analog-to-digital converter selectively coupled to the conductive line via a switch;
a second analog-to-digital converter connected to the conductive line, wherein the first and second analog-to-digital converters are analog-to-digital converters of different types; and
the switch is configured to selectively disconnect the first analog-to-digital converter from the conductive line and connect the first analog-to-digital converter to the conductive line while the second analog-to-digital converter remains connected to the conductive line.

18. The image sensor defined in claim 17 further comprising:
digital data processing circuitry coupled to the first and second analog-to-digital converters and operable to generate a digital output based on respective outputs from the first and second analog-to-digital converters.

19. The image sensor defined in claim 17 further comprising:
gain adjustment circuitry coupled to the first and second analog-to-digital converters.

* * * * *